May 15, 1951  G. A. PEEPS, JR., ET AL  2,552,689
ROTARY SHAFT SEAL
Filed Aug. 8, 1950
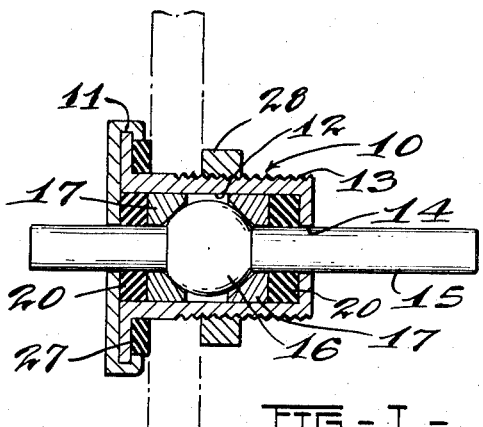
FIG-I-
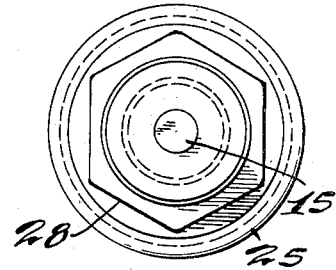
FIG-II-
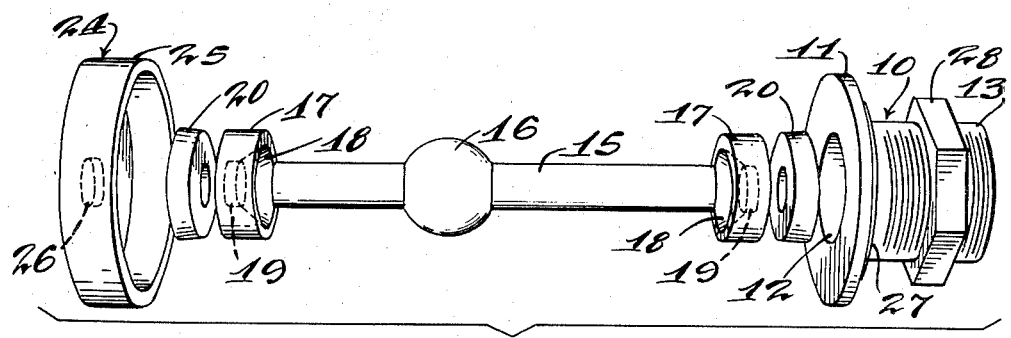
FIG-III-
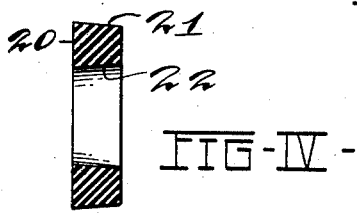
FIG-IV-
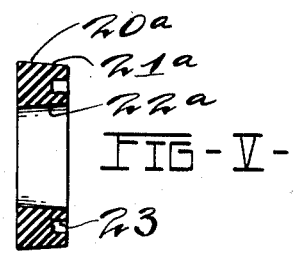
FIG-V-
INVENTORS:
GEORGE A. PEEPS, JR.,
BY ROBERT J. MELCHER
Owen & Owen
ATTYS.

Patented May 15, 1951

2,552,689

UNITED STATES PATENT OFFICE 2,552,689

ROTARY SHAFT SEAL

George A. Peeps, Jr., and Robert J. Melcher, Toledo, Ohio, assignors to H. H. Buggie & Company, Toledo, Ohio, a corporation of Ohio Application August 8, 1950, Serial No. 178,224

2 Claims. (Cl. 286—11.13)

This invention relates to a device for sealing a rotary shaft against the penetration of moisture or the passage of air through a wall through which the shaft extends.

In many installations of radio, radar and other electronic devices, sections of the devices are hermetically sealed in pressure and moistureproof cases or housings in order to protect the instruments against changes in temperature, humidity and pressure. Many such devices must be equipped with manually variable controls and it is necessary, therefore, that some means be provided for introducing shafts into the interior of the cases which can be rotated by hand from the outside to set controls or instruments inside. Many complex and expensive shaft seals have been developed most of which are made up of numerous parts and few of which are effective.

It is known that if a seal can be made with the two surfaces to be sealed in line contact, a very effective seal can be maintained with low pressure and, consequently, the two parts in sealing contact can be relatively moved with low torque.

It is the principal object of this invention to provide a rotary shaft seal for installation in the wall of a sealed cabinet or case for the transmission of rotary motion into the interior of the cabinet or case which is made of only a few simple parts, inexpensive to fabricate and assemble.

In the drawings:

Figure I is a vertical, sectional, longitudinal view of a rotary shaft seal embodying the invention and showing how the seal is installed in the wall of an instrument containing case.

Figure II is an end view in elevation taken from the right side of Figure I.

Figure III is an exploded view on an enlarged scale of the elements constituting a rotary shaft seal embodying the invention and prior to assembly.

Figure IV is a vertical sectional view on a still larger scale showing one form of a sealing element which may be employed in a rotary shaft seal embodying the invention.

Figure V is a view similar to Figure IV but of a modified element.

A rotary shaft seal embodying the invention may comprise, among other parts, a thimble shaped housing 10 having a circular flange 11, a smooth cylindrical interior surface 12, exterior threaded section 13 and a closed end having an axially located shaft opening 14. The housing 10 fits through a circular opening in a casing wall of the instrument housing with which the device is used, (the casing wall being shown in broken lines in Figure I). The elements of the device include a shaft 15 having a spherical section 16 integrally constructed with the shaft and of a diameter such that it fits quite loosely within the interior of the housing 10. On each side of the sphere 16 is a sealing element 17, each of which has a conical, axially extending bore 18 terminating in a hole 19 of a diameter substantially the same as the shaft 15. As can be seen in Figure I, the walls of the cone shaped bores 18 engage the surface of the spherical section 16 when the device is assembled. The angle of the walls of the conical bores 18 is such that their surfaces engage the sphere tangentially forming thereon a single circular line contact at each side of the sphere.

Two sealing gaskets 20 are generally annular in shape but have reversed conical exterior and inner surfaces 21 and 22 so that the cross section of the body is wedge shaped. The two gaskets 20 are turned oppositely with their smaller surfaces turned inwardly. The center bores of the gaskets 20 fit the exterior of the shaft 15 in their smaller diameters and the larger diameters of their exterior surfaces 21 fit snugly within the cylindrical interior 12 of the housing 10. The gaskets 20 are so formed in order to allow for displacement of the material from which they are formed when the shaft seal is assembled and should be made of relatively soft resilient material such as artificial or natural rubber to permit such displacement and tight sealing against the inner wall of the housing 10.

A modified form of gasket 20a is illustrated in Figure V and has, in addition to the conical outer wall 21a and inner wall 22a, a re-entrant groove 23 cut in its outer face which increases the amount of displacement of material possible during assembly and sealing of the device.

The rotary shaft seal is provided with a shallow cup shaped end plate 24 having an annular flange 25 and an axial hole 26 through which the shaft 15 projects into the interior of the casing. The other end of the shaft 15 projects out of the hole 14 in the bottom of the thimble shaped housing 10 and may receive a conventional knob or other manually graspable means for rotating the shaft.

The device is provided with an external sealing gasket 27 (Figure I) which is placed against the inner surface of the casing wall and a clamping nut 28, which is tightened against the exterior of the casing wall to compress the gasket 27 and seal around the exterior of the housing 10.

The device is assembled by telescoping the parts shown in Figure III into the relative position shown in Figure I and spinning the flange 25 over the lip of the flange 11 to permanently assemble the parts. The sealing gaskets 20 are of such size and the sealing elements 17 of such axial dimensions, that when the lip 25 is spun over the flange 11 the elements are all compressed and assembled in proper relationship to firmly press the cone shaped walls 18 against the surface of the spherical portion 16 to form a line contact at each side.

The modified form of gasket as shown in Figure V may be used when it is desired to more tightly compact the elements of the device and the re-entrant groove 23 provides for greater displacement of the material from which the gasket is made. This form may be used, for example, under different pressure or humidity conditions or to withstand different changes therein as desired. The re-entrant groove is particularly effective in "softening" the sealing gaskets in shaft seals of larger sizes where the mechanical force necessary to displace the material outwardly and inwardly would be excessively great if the inner narrow face of the gasket were not cut away by the groove.

After assembly of the device the rotary shaft seal can be treated as a unitary component and mounted in a casing wall by clamping the nut 28 against the exterior to compress the sealing gasket 27 which is the same as if it were a standard shaft element being mounted without question of pressure sealing. It has been found that a rotary shaft seal embodying the invention withstands substantial pressures without leaking for long periods of time. The only path through which pressure might leak is the path along the exterior of the shaft 15 and over the surface of the spherical portion 16 and the two line contact seals between the cone shaped walls 18 and the spheres 16 effectively prevent such leakage.

The two sealing elements 17 should preferably be formed of a material such as rubber bonded graphite, for example, which maintains a good, clean surface and is not rapidly worn down or compressed. Some wear, of course, will take place but is automatically compensated for by the expansive force created by the displaced material in the sealing gaskets 20.

Various modifications in materials are possible within the knowledge of the art and the particular materials disclosed for both the sealing gaskets 20 and the sealing elements 17 are not the basis of the invention which resides in the combination and configuration of cooperative elements as set forth in the following claims.

Having described the invention, we claim:

1. A rotary shaft seal adapted for mounting in a wall of a housing comprising, in combination, a thimble shaped cylindrical interior housing mountable in said wall and having a closed end with an axial shaft bore therein and an open end, a shaft extending through said bore and coaxially through said housing, said shaft having a spherical portion, cone-bored sealing members positioned adjacent said spherical portion and tangentially engaging opposite sides thereof, annular resilient sealing washers having wedge shaped cross sections with the larger surfaces thereof directed axially outwardly and located exteriorly of said sealing members and an axially bored cap over the open end of said housing for compressing said washers axially inwardly thereby displacing the material thereof radially outwardly against the interior of said cylindrical housing.

2. A device for sealing a rotary shaft against passage of moisture, pressure and the like, comprising, in combination, a spherical portion integral with said shaft and located generally centrally therealong, a housing having a cylindrical interior of diameter larger than said spherical portion and a closed end having an axial aperture through which said shaft extends, a pair of generally disk shaped sealing members closely fitting on said shaft on opposite sides of said spherical portion and having cone shaped inwardly directed bores, the walls of said bores tangentially engaging the surface of said spherical portion, an annular, resilient sealing gasket adjacent that side of each of said members opposite said spherical portion, said gaskets having wedge shaped cross sections with the smaller ends turned inwardly axially adjacent the surfaces of said sealing members, the opposite side of one of said gaskets lying against said end wall and a flanged, axially bored cap closing the open end of said housing and acting against the other of said gaskets to resiliently compress all of said gaskets and members axially and to displace said gaskets radially against the inner surface of said housing.

GEORGE A. PEEPS, Jr.
ROBERT J. MELCHER.

REFERENCES CITED

The following references are of record in the file of this patent:

UNITED STATES PATENTS

| Number | Name | Date |
|---|---|---|
| 625,412 | Pashley | May 23, 1899 |
| 2,452,352 | Booth | Oct. 26, 1948 |
| 2,473,502 | Bard | June 21, 1949 |
| 2,510,414 | Philbrick | June 6, 1950 |

FOREIGN PATENTS

| Number | Country | Date |
|---|---|---|
| 6,485 | Great Britain | of 1887 |
| 447,502 | Great Britain | May 20, 1936 |
| 22,239 | Great Britain | of 1900 |